US006854969B2

(12) United States Patent
Shibagaki et al.

(10) Patent No.: US 6,854,969 B2
(45) Date of Patent: Feb. 15, 2005

(54) APPARATUS FOR MOLDING HONEYCOMB STRUCTURE AND MOLDING METHOD

(75) Inventors: Yukinari Shibagaki, Nagoya (JP); Takeyuki Isii, Nagoya (JP); Yoshimasa Kondo, Nagoya (JP)

(73) Assignee: NGK Insulators, Ltd. (JP)

( * ) Notice: Subject to any disclaimer, the term of this patent is extended or adjusted under 35 U.S.C. 154(b) by 259 days.

(21) Appl. No.: 10/102,737

(22) Filed: Mar. 22, 2002

(65) Prior Publication Data

US 2003/0001308 A1 Jan. 2, 2003

(30) Foreign Application Priority Data

Mar. 28, 2001 (JP) ....................................... 2001-093414

(51) Int. Cl.[7] ................................................ B29C 47/12

(52) U.S. Cl. .................... 425/378.1; 425/466; 425/467; 419/67

(58) Field of Search ....................... 419/5, 67; 425/113, 425/378.1, 466, 467, 381, 380

(56) References Cited

U.S. PATENT DOCUMENTS

| | | | | | |
|---|---|---|---|---|---|
| 3,884,611 | A | * | 5/1975 | Anderson et al. | 425/382.4 |
| 3,905,743 | A | * | 9/1975 | Bagley | 425/464 |
| 3,947,214 | A | * | 3/1976 | Cunningham | 425/467 |
| 4,349,329 | A | * | 9/1982 | Naito et al. | 425/461 |
| 4,381,912 | A | * | 5/1983 | Yamamoto et al. | 425/461 |
| 4,551,295 | A | * | 11/1985 | Gardner et al. | 264/177.11 |
| 4,668,176 | A | * | 5/1987 | Zeibig et al. | 425/464 |
| 4,710,123 | A | * | 12/1987 | Ziebig et al. | 425/464 |
| 4,911,868 | A | * | 3/1990 | Reifenhauser et al. | 264/408 |
| 5,089,203 | A | | 2/1992 | Kragle | 264/177 |
| 5,466,415 | A | * | 11/1995 | Brundage et al. | 419/67 |
| 5,679,383 | A | * | 10/1997 | Ryan et al. | 425/141 |
| 5,906,839 | A | * | 5/1999 | Miura et al. | 425/380 |
| 5,942,260 | A | * | 8/1999 | Kodama et al. | 425/190 |
| 5,962,041 | A | * | 10/1999 | Ryan et al. | 425/466 |
| 5,980,227 | A | * | 11/1999 | Murata et al. | 425/144 |
| 6,247,915 | B1 | * | 6/2001 | Miyazaki | 425/380 |
| 6,287,103 | B1 | * | 9/2001 | Miyazaki | 425/131.1 |

FOREIGN PATENT DOCUMENTS

| | | | |
|---|---|---|---|
| DE | 3521883 | A1 | 12/1985 |
| EP | 0 800 903 | A1 | 10/1997 |
| JP | 08-239701 | | 9/1996 |
| JP | 09-277234 | | 10/1997 |

* cited by examiner

*Primary Examiner*—Mark Eashoo
(74) *Attorney, Agent, or Firm*—Parkhurst & Wendel, L.L.P.

(57) ABSTRACT

A honeycomb structure molding apparatus 1 having a spinneret 4 provided with a back pore part 3 for introducing a molding material and a slit part 2 for extruding the molding material, and a press plate 5 for fixing the spinneret 4, in which the spinneret 4 comprises an inner side part 11 and an outer peripheral part 12, the inner side part 11 is protruded to the downstream side to form a level difference part 15 between the inner side part 11 and the outer peripheral part 15, the press plate 5 is opened opposing the inner side part 12 of the spinneret 4 and presses the downstream side of the outer peripheral part 12 of the spinneret 4 through a gap part 7, and there is provided a gap adjusting means 130 capable of changing width of the gap of the gap part 7.

19 Claims, 17 Drawing Sheets

APPARATUS FOR MOLDING HONEYCOMB STRUCTURE AND MOLDING METHOD

BACKGROUND OF THE INVENTION

The present invention relates to an apparatus for molding a honeycomb structure and a method for molding a honeycomb structure using the molding apparatus. More particularly, it relates to a molding apparatus for making a honeycomb structure useful, for example, as a catalyst carrier for controlling exhaust gases of automobiles, and a method for molding the honeycomb structure which makes it possible to reduce failure in formation of outer walls of the honeycomb structure by adding various functions to a press plate which fixes a spinneret.

Problems which become afresh are influences on earth environments and ecosystems of nitrogen oxides, sulfur oxides, hydrogen chloride, etc. contained in exhaust gases of automobiles in addition to carbon dioxide which warms the earth. It is said that, in the future, automobiles which utilize as energy source, for example, electricity, natural gas or methanol which have less influences on the ecosystem will be substituted for automobiles which utilize gasoline and gas oil as energy source. However, there are difficulties to be overcome for practical use of these technologies, and tentative measures are reduction of cost of fuels and purification of exhaust gases. The honeycomb structures with which the present invention concerns are used for exhaust gas purification apparatuses of automobiles as a technology for the solution of environmental problems.

For example, honeycomb structures made of ceramics materials or metallic materials as shown in FIGS. 6–8 are used as catalyst carriers for exhaust gas purification apparatuses of automobiles. FIG. 7 is an oblique view of a honeycomb structure 61, FIG. 8 is a front view of the honeycomb structure 61, and FIG. 6 is a partially enlarged view of the honeycomb structure 61. This honeycomb structure is nearly columnar as shown in FIG. 7, and comprises partition walls 64 having a honeycomb structure which form many cells 63 and an outer wall 62 covering the outer periphery.

For making such honeycomb structure 61, an apparatus for molding honeycomb structures, for example, as shown in FIG. 5 is used. FIG. 5 is a vertical sectional view of an apparatus 50 for molding honeycomb structure which is provided with back pore part 53 from which a molding material is introduced, a spinneret 54 having slit a part 52 which ejects the molding material, and a press plate 55 provided downstream the spinneret 54. Extrusion molding is carried out using this apparatus to make the honeycomb structure 61.

In the honeycomb structure molding apparatus 50, the spinneret 54 comprises inner side part 71 and outer periphery part 72, and the inner side part 71 protrudes to downstream side to form a level difference part 75 between the inner side part 71 and the outer periphery part 72. At the press plate, there is provided a gap part 57 which molds the outer wall of the honeycomb structure. Press jig 58 and back press plate 59 are holders for setting the spinneret 54 and the press plate 55.

In carrying out extrusion molding by the honeycomb structure molding apparatus, the molding material is extruded from the upstream side of spinneret 54 to the downstream side through the spinneret 54 by an extruder (not shown) as shown in FIG. 5. The molding material extruded from slit 73 provided in the inner side part 71 of the spinneret 54 opened on the downstream side forms a honeycomb structure comprising many cells 63.

On the other hand, the molding material extruded from slit 74 provided in the outer peripheral part 72 of the spinneret 54 changes in its running direction to the level difference part 75 from the extrusion direction with rupturing of the honeycomb shape being caused by the action of the slit part 57, and again changes in its running direction to the extrusion direction at the position where the press plate 55 opens, thereby forming an outer wall 62 surrounding the cells 63.

However, in such conventional honeycomb structure molding apparatus and molding method, there is the problem of failure in formation of the outer wall.

As an example of failure in formation of outer wall, mention may be made of formation of waviness as shown in FIG. 9 and FIG. 10. FIG. 9 is a front view of a honeycomb structure having wavy wall, and FIG. 10 is a side view of a honeycomb structure having wavy wall. It is considered that wavy wall portion 92 of the honeycomb structure 91 is formed because the amount of the molding material becomes larger than in other portions and cells are ruptured to form waviness, and it is assumed that this is caused since molding speed of the outer wall part is higher than that of the part of the cells 63.

If this wavy wall is formed at various portions of the outer wall, failure in bending is caused. The honeycomb structure which is to be columnar is formed with undulation, resulting in increase of gas permeability resistance in addition to inferior appearance and thus the honeycomb structure is not suitable as product.

As another example of failure in formation of the outer wall, there is the formation of burrs as shown in FIG. 11 and FIG. 12. FIG. 11 is a front view of a honeycomb structure having burrs, and FIG. 12 is a side view of a honeycomb structure having burrs. It is considered that the burr portions 96 of the honeycomb structure 95 are formed because the amount of the molding material becomes smaller than in other portions and the outer wall is not formed, and it is assumed that this is caused since molding speed of the outer wall portion 62 is lower than that of the portion of the cells 63.

It is considered to be inevitable that the molding speed of the portion of the outer wall 62 becomes higher or lower than that of the portion of the cells 63, since fluidity of the molding material cannot necessarily be maintained constant and there is variation in working precision of the spinneret or the press plate. The fluidity of the molding material is affected by various factors. For example, in the case of ceramics, the fluidity is affected by delicate variations of particle diameter or shape of the molding material, water content, kneading degree, atmospheric temperature and humidity, etc. Therefore, the fluidity of the molding material changes momentarily even in a day, and can hardly be maintained constant.

Thus, change of fluidity of the molding material greatly affects the extrusion moldability. Therefore, it is necessary to select optimum shape or size of the press plate 55 from a plurality of press plates before starting of the extrusion molding or to change thickness of the slit part 57. It is also necessary to select the back press plate 59 of optimum inner diameter upon occasion.

However, even if the press plate 55 and others are set in the optimum state, the fluidity of the molding material is not necessarily stable owing to environmental changes at the use and variation of the molding material, and, as a result, satisfactory outer wall 62 cannot necessarily be formed.

Therefore, it is necessary to stop the honeycomb structure molding apparatus 50 each time and exchange the press plate 55 or adjust the back press plate 59. However, these measures are temporary ones to deal with the conditions such as environment under which failure of formation of outer wall occurs, but cannot be employed when the environment changes. Furthermore, these measures require a relatively long operation time, and hence there is the problem of sharp reduction of productivity.

In order to solve the above problems, various means have been proposed.

For example, JP-A-8-239701 discloses a metallic honeycomb body and a method for making the same. FIG. 2 is an elevation sectional view of a die assembly of the disclosed apparatus for making metallic honeycomb bodies. Using the apparatus 20 for making metallic honeycomb materials comprising combination of a mask 22 having a ring reservoir and a die 24 having a skin forming slit 28 of a suitable size, a plasticized batch material discharged outside from slots 23 near the peripheral part of the die 24 is discharged into adjacent but different two areas of the die 24. That is, by discharging the material into the ring reservoir 21 in the closed surface of mask 22 and into the skin forming slit 28 formed between outlet surface and edge of mask opening part, honeycomb (cell portion) and outer skin (outer wall portion) are sufficiently bonded without causing separation, and thus a firmly integrated metallic honeycomb body having a thick outer skin can be obtained.

However, in the case of, for example, a ceramics molding material, it is known that being different from metal particles, the fluidity is greatly different depending on the flow direction of the molding material particles, and failure in formation of outer wall often occurs.

JP-A-9-277234 discloses an apparatus for molding honeycomb structures and a molding method. FIG. 3 is a sectional view of the disclosed apparatus for molding honeycomb structures. The molding apparatus 30 for honeycomb structures comprises a metal mold 33 having a slit 31 for molding the honeycomb structure 32 and a guide ring 34, and the guide ring 34 has an opening edge part 35 and a pool part 36, and, besides, a temperature adjusting device 37 for adjusting the temperature of the guide ring 34. By this temperature adjusting device 37, temperature of ceramic material for forming outer skin (outer wall) which is retained in the pool part 36 of the guide ring 34, and, as a result, fluidity of the ceramic material can be changed and, hence, the molding rate of the outer skin (outer wall) and that of the body portion (cell portion) can be coincided. Thus, formation of wrinkles, burrs, etc. can be inhibited.

However, in the case of using a molding material inferior in heat conduction, sufficient heat cannot be given to the molding material only by the adjustment of temperature and sufficient effect cannot be obtained.

SUMMARY OF THE INVENTION

The present invention has been made in view of the above problems, and the object is to provide a honeycomb structure molding apparatus capable of inhibiting failure in formation of outer wall by making possible the fine adjustment of molding rate of the outer wall of honeycomb structure or realizing to keep more constant the molding rate, and a molding method using the apparatus.

That is, according to the present invention, there are provided three embodiments of honeycomb structure molding apparatuses and two different methods for molding the honeycomb structures.

First, there is provided a first honeycomb structure molding apparatus having at least a spinneret provided with a back pore part for introducing a molding material and a slit part for extruding the molding material, and a press plate for fixing the spinneret, characterized in that the spinneret comprises an inner side part and an outer peripheral part, the inner side part is protruded to the downstream side to form a level difference part between the inner side part and the outer peripheral part, the press plate is opened opposing the inner side part of the spinneret and presses the downstream side of the outer peripheral part of the spinneret through a gap part formed between the spinneret and the press plate, and there is provided a gap adjusting means capable of changing width of the gap of the gap part.

The first honeycomb structure molding apparatus of the present invention can be suitably used for molding a honeycomb structure where the molding material is a mixed molding material containing at least a ceramics powder and/or a metal powder and a molding aid.

In the first honeycomb structure molding apparatus of the present invention, the gap adjusting means preferably comprises a flexible part provided at the press plate and an adjusting instrument bending the flexible part, said adjusting means bending the flexible part to fix it at a desired position and adjust the width of the gap. In this case, a screw which pierces through the press plate and whose head is exposed on the upper surface of the press plate can be used as the adjusting instrument. Furthermore, it is preferred that the gap adjusting means is provided at an inner peripheral end part of the press plate and opposite to the innermost part of the outer peripheral part of the spinneret, and a plurality of the gap adjusting means are provided dividing the inner periphery at equal intervals. The range of adjustment of the width of the gap by the gap adjusting means is preferably about 0–0.50 mm.

Next, according to the present invention, there is provided a second honeycomb structure molding apparatus for obtaining a honeycomb structure by extrusion molding a molding material containing at least a ceramics powder and a molding aid, wherein at least a spinneret provided with a back pore part for introducing the molding material and a slit part for extruding the molding material, and a press plate for fixing the spinneret, the spinneret comprises an inner side part and an outer peripheral part, the inner side part is protruded to the downstream side to form a level difference part between the inner side part and the outer peripheral part, the press plate is opened opposite to the inner side part of the spinneret and press the downstream side of the outer peripheral part of the spinneret through a gap part, and a reservoir part comprising a ring dented part is provided in the press plate at the position outside by a given length L facing the gap part from the innermost end of the face opposing the downstream side of the outer periphery part of the spinneret. In this case, the volume of the dented part of the reservoir is preferably 1.8 times the volume of the gap part which is inside the reservoir and parallel to the spinneret.

According to the present invention, there is also provided a third honeycomb structure molding apparatus having the characteristics of both the first honeycomb structure molding apparatus and the second honeycomb structure molding apparatus.

The first to third honeycomb structure molding apparatuses are preferably provided with a temperature control means capable of changing the temperature of the molding material. In this case, the temperature control means is preferably a means having at least a hollow passage provided in the press plate and a water feeding device which allows a circulating water of a desired temperature to flow through the hollow passage, and controlling the temperature of the molding material by changing the temperature of the press plate. The range of the temperature to be controlled by the temperature control means is preferably 5–35° C. Furthermore, it is also preferred that the temperature control means is provided with a temperature control meter at the press plate and/or the spinneret, whereby automatic temperature control becomes possible.

In the first to third honeycomb structure molding apparatuses of the present invention, it is preferred that the level difference part formed at the spinneret is tapered forming an inclined plane of about 30–60° or right-angled forming an inclined plane of about 90°.

The first to third honeycomb structure molding apparatuses of the present invention can be suitably used for making a honeycomb structure used as catalyst carriers for purification of exhaust gas of automobiles in which a catalyst is supported on the surface of cell partition wall and/or the inner surface of pores in the partition wall.

Next, according to the present invention, two molding methods are provided.

First, there is provided a first method for molding a honeycomb structure which comprises extrusion molding a molding material containing at least a ceramics powder and/or a metallic powder and a molding aid, characterized in that there is used a honeycomb structure molding apparatus having at least a spinneret provided with a back pore part for introducing a molding material and a slit part for extruding the molding material and a press plate for fixing the spinneret, the spinneret comprising an inner side part and an outer peripheral part, the inner side part being protruded to the downstream side to form a level difference part between the inner side part and the outer peripheral part, the press plate being opened opposite to the inner side part of the spinneret and pressing the downstream side of the outer peripheral part of the spinneret through a gap part formed between the spinneret and the press plate, and the molding material is extruded with adjusting the width of the gap of the gap part, thereby to form an outer wall having a uniform thickness.

Further, there is provided a second method for molding a honeycomb structure which comprises extrusion molding a molding material containing at least a ceramics powder and/or a metallic powder and a molding aid, characterized in that there is used a honeycomb structure molding apparatus having at least a spinneret provided with a back pore part for introducing a molding material and a slit part for extruding the molding material and a press plate for fixing the spinneret, the spinneret comprising an inner side part and an outer peripheral part, the inner side part being protruded to the downstream side to form a level difference part between the inner side part and the outer peripheral part, the press plate being opened opposite to the inner side part of the spinneret and pressing the downstream side of the outer peripheral part of the spinneret through a gap part formed between the spinneret and the press plate, a reservoir part comprising a ring dented part being provided in the press plate at the position outside by a given length L facing the gap part from the innermost end of the face opposing the downstream side of the outer peripheral part of the spinneret, and the molding material is extruded through the reservoir part, thereby to form an outer wall having a uniform thickness.

According to these molding methods, variation of thickness of the outer wall can be within about ±0.05 mm.

Figure 1:
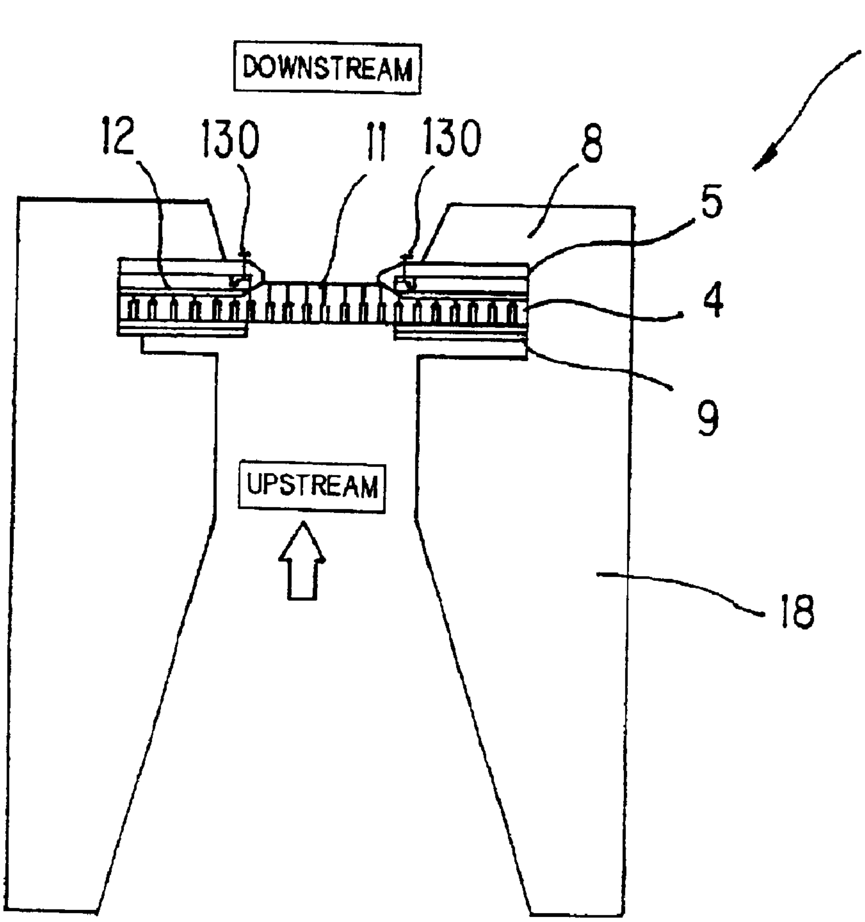
FIG. 1 is a sectional view showing one example of the first honeycomb structure molding apparatus of the present invention.
Figure 2:
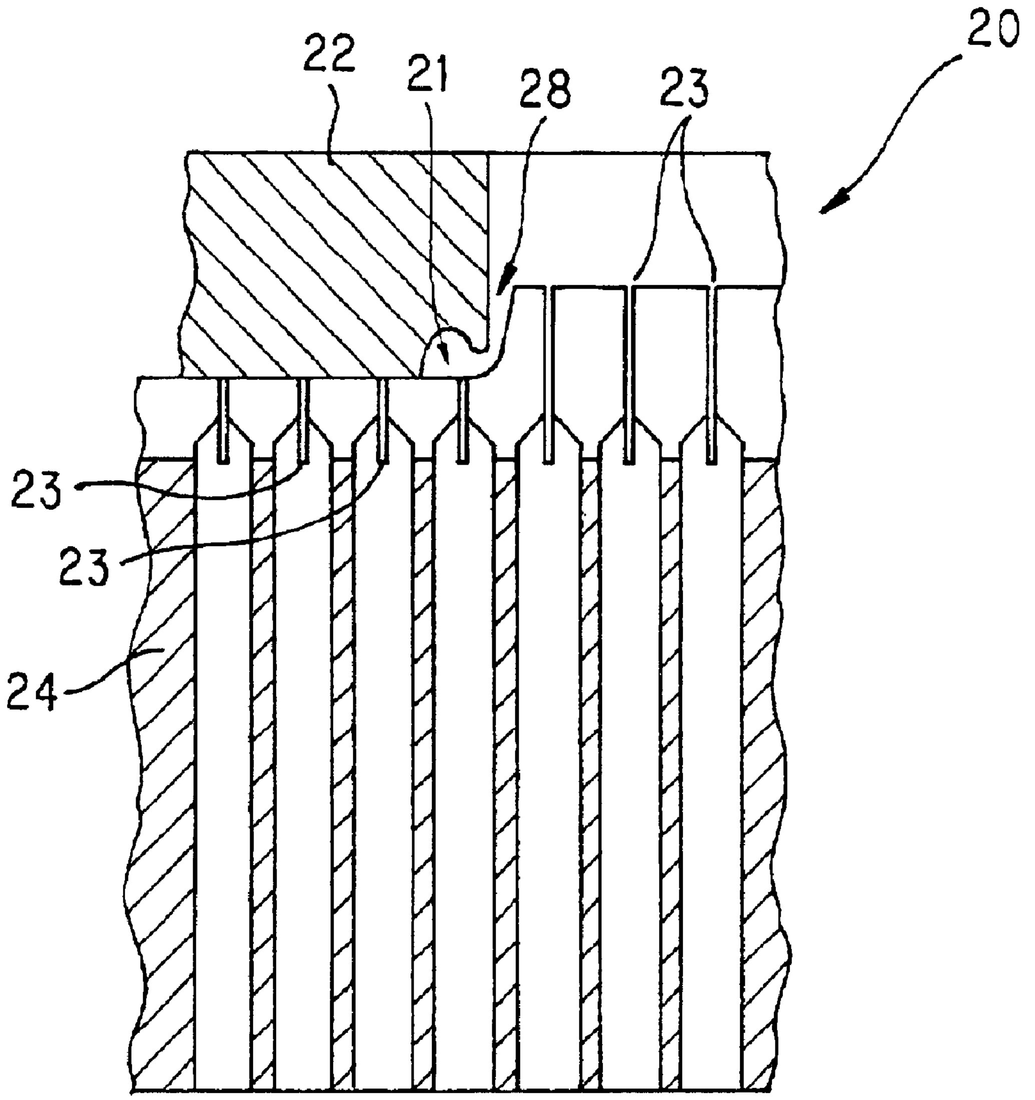
FIG. 2 is an elevational sectional view of a part showing an example of a conventional metallic honeycomb structure molding apparatus.
Figure 3:
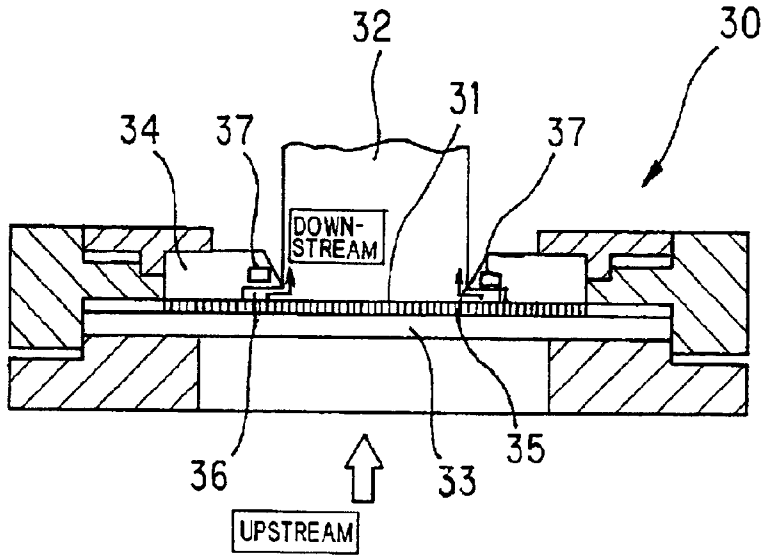
FIG. 3 is a sectional view showing an example of a conventional ceramic honeycomb structure molding apparatus.

Reference numerals in the drawings have the following meanings.

1—First honeycomb structure molding apparatus, 2—Slit part, 3—Back pore part, 4—Spinneret, 5—Press plate, 7—Gap part, 8—Press jig, 9—Back press plate, 11—Inner side part, 12—Outer peripheral part, 13—Slit (inner side part), 14—Slit (outer peripheral part), 15—Level difference part, 18—Die holder, 20—Metallic honeycomb structure molding apparatus, 21—Ring reservoir, 22—Mask, 23—Discharging slot, 24—Die, 28—Gap part for forming skin, 30—Honeycomb structure molding apparatus, 31—Slit, 32—Honeycomb structure, 33—Metal mold, 34—Guide ring, 35—Opening edge part, 36—Pool part, 37—Temperature control device, 40—Honeycomb structure molding apparatus (with temperature control means), 41—Water feeding device, 42—Water feeding piping, 43—Hollow passage, 44—Spinneret, 45—Press plate, 46—Temperature control means, 48—Press jig, 49—Heat insulation material, 50—Honeycomb structure molding apparatus (conventional apparatus), 52—Slit part, 53—Back pore part, 54—Spinneret, 55—Press plate, 57—Gap part, 58—Press jig, 59—Back press plate, 61—Honeycomb structure, 62—Outer wall, 63—Cell, 64—Partition wall, 71—Inner side part, 72—Outer peripheral part, 73—Slit (inner side part), 74—Slit (outer peripheral part), 75—Level difference part, 91—Honeycomb structure, 92—Wavy wall part, 95—Honeycomb structure, 96—Burr part, 130—Gap adjusting means, 131—Adjusting instrument, 132—Flexible part, 133—Gap adjusting means, 134—Flexible part, 140—Second honeycomb structure molding apparatus, 142—Slit, 143—Back pore part, 144—Spinneret, 145—Press plate, 147—Gap part, 151—Reservoir, 152—Outer peripheral part, 153—Slit (inner side part), 154—Slit (outer peripheral part), 155—Level difference part, 165—Level difference part

DESCRIPTION OF THE PREFERRED EMBODIMENTS

The honeycomb structure molding apparatus of the present invention will be specifically explained by the following embodiments, but these embodiments should never be construed as limiting the invention and various variations, modifications and improvements can be made without departing from the scope of the invention.

Figure 13:
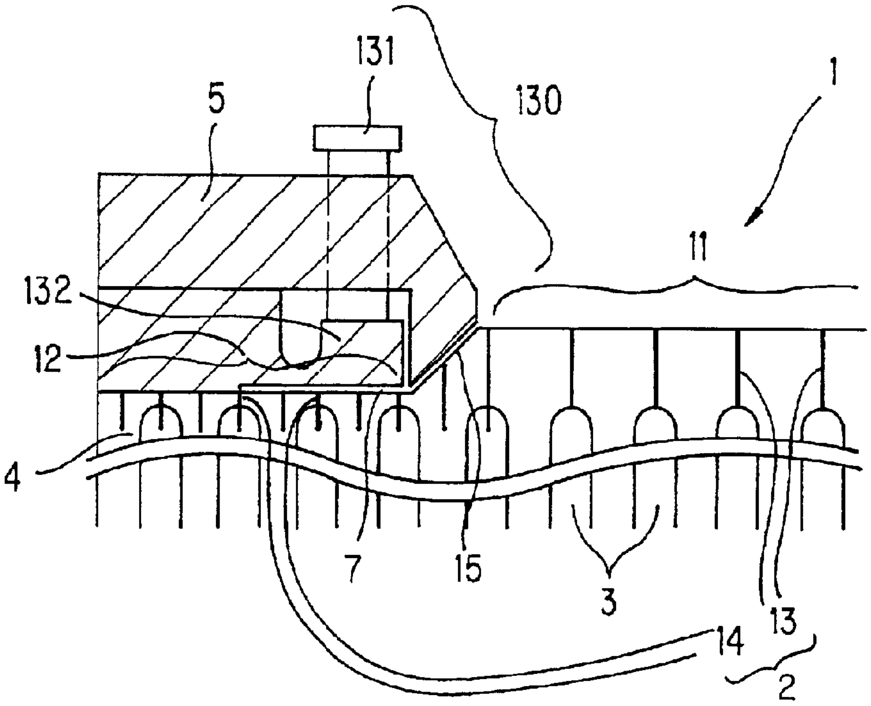
FIG. 13 is a partially enlarged sectional view showing one example of the first honeycomb structure molding apparatus of the present invention.
Figures 17A, 17B:
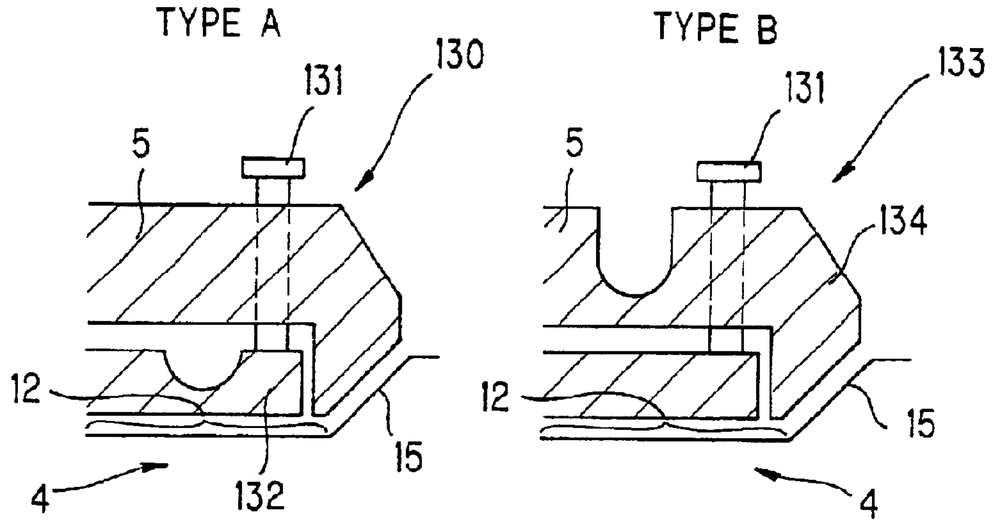
FIGS. 17(*a*) and (*b*) are partially enlarged sectional views showing illustrative examples of the gap width adjusting means in the first honeycomb structure molding apparatus of the present invention, respectively.

The first honeycomb structure molding apparatus will be explained referring to FIG. 1, FIG. 13, FIGS. 14(*a*) and (*b*), and FIGS. 17(*a*) and (*b*). FIG. 1 is a sectional view showing one example of the first honeycomb structure molding apparatus of the present invention, FIG. 13 is a partially enlarged sectional view, and FIGS. 14(*a*) and (*b*) explain the operation. FIGS. 17(*a*) and (*b*) are partially enlarged sectional views showing two examples of the gap adjusting means provided at the first honeycomb structure molding apparatus of the present invention.

The first honeycomb structure molding apparatus 1 of the present invention is an apparatus for making a honeycomb structure using as a molding material, for example, one or both of a ceramics powder and a metallic powder which are mixed with a molding aid. The first honeycomb structure molding apparatus 1 has a spinneret 4 provided with a back pore part 3 for introduction of the molding material and a slit part 2 for extruding the molding material. The spinneret 4 comprises an inner side part 11 and an outer peripheral part 12, and is fixed by a back press plate 9 provided on the upstream side and a press plate 5 provided on the downstream side. Spinneret 4, press plate 5 and back press plate 9 are held by a press jig 8, and the press jig 8 is supported by a die holder 18.

The inner side part 11 of the spinneret 4 is protruded to the downstream side to form a level difference part 15 between the inner side part 11 and the outer peripheral part 12. In more detail, the slit part 2 provided at the spinneret 4 comprises slit 13 provided at the inner side part 11 and slit 14 provided at the outer peripheral part 12. The press plate 5 is opened at the portion of downstream side opposite to the inner side part 11, namely, nearly the central portion, and simultaneously presses the downstream side of the outer peripheral part 12 of the spinneret 4 spacing a gap part 7 formed between the spinneret 4 and the press plate 5, thereby fixing the spinneret 4. The gap part 7 is a part through which the molding material passes, and includes the gap formed between the level difference part of the spinneret and the press plate. The width of the gap part 7 means a distance between the spinneret 4 and the press plate 5 in the gap part 7 which face each other nearly in parallel.

In the first honeycomb structure molding apparatus 1, a gap adjusting means 130 capable of changing the width of the gap of the gap part 7 is provided at the press plate 5. The gap adjusting means 130 comprises a flexible part 132 and an adjusting instrument 131 which flexes the flexible part 132. In the gap adjusting means 130, position at which the flexible part 132 is formed or size of the flexible part 132 is not limited as far as the width of the gap of the gap part 7 can be varied by the flexible part 132. Furthermore, the gap adjusting means 130 adjusts the width of the part through which the molding material passes, and does not limit the position of the gap part 7 to be adjusted. As the gap adjusting means, mention may be made of, for example, type A and type B shown in FIG. 17. The gap adjusting means 130 of the type A comprises a thin flexible part 132 provided at the face opposing the downstream side of the outer peripheral part 12 of the spinneret 4 and an adjusting instrument 131 which press the flexible part 132 in contact therewith. The gap adjusting means 133 of the type B has a portion in the flexible part 134 which flexes to the downstream side in the press plate 5, namely, the side opposite to the spinneret 4, and adjusts especially the width of the gap of the gap part 7 formed between the level difference part 15 and the press plate 5.

The gap adjusting means 130 of type A shown in FIG. 17 will be explained referring to FIGS. 14(*a*) and (*b*).

Figure 14A:
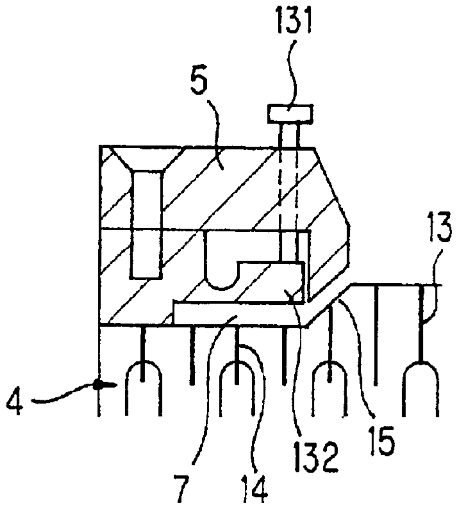
FIGS. 14(*a*) and (*b*) explain operation of the first honeycomb structure molding apparatus of the present invention, and FIG. 14(*a*) shows the original state, and (*b*) shows the applied state.
Figure 14B:
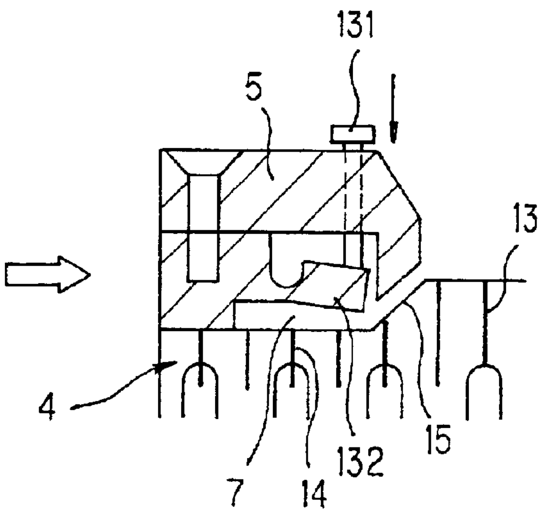

As shown in FIGS. 14(*a*) and (*b*), the flexible part 132 is flexed by adjusting device 131 in vertical direction, and thus the width of the gap of the gap part 7 can be adjusted. After adjusting the width of the gap as shown in FIG. 14(*b*), the flexible part 132 is fixed at a desired position by the adjusting device 131. As the adjusting device 131, there may be employed, for example, a screw which pierces the press plate 5 with its head being exposed on the upper face of the press plate 5 as shown in FIG. 13. This gap adjusting means 130 of type A is provided at the inner peripheral end part of the press plate 5 in opposing the innermost part of the outer peripheral part 12 of the spinneret 4 as shown in FIG. 13.

The gap adjusting means 130 is preferably provided at a plurality of positions with dividing the inner periphery of the press plate 5 at equal intervals although this is not shown. It is preferred to provide them at 6 positions or more so that the positions are vertexes of a polygon. The range of gap adjustment of this gap adjusting means is generally about 0–0.50 mm, which is effective for inhibition of occurrence of failure in formation of outer wall.

In the first honeycomb structure molding apparatus 1 of the present invention, a molding material is extruded from the upstream side of the spinneret 4 to the downstream side through the spinneret 4 by an extruder (not shown), and the molding material extruded from slits 13 provided at the inner side part 11 of the spinneret 4, the downstream side of which is opened forms a honeycomb structure comprising many cells.

On the other hand, as in the conventional technique, the molding material extruded from slits 14 provided at the outer peripheral part of the spinneret 4 changes its progressing direction from the extrusion direction to the direction of the level difference part 15 with the honeycomb form being ruptured by the action of the gap part 7 and again changes its progressing direction to the extrusion direction at the opening of the press plate 5 thereby forming an outer wall which surrounds the cells.

The first honeycomb structure molding apparatus 1 of the present invention is provided with the gap adjusting means 130 as mentioned above, and the extruding speed of the molding material can be easily increased by narrowing the width of the gap of the gap part 7 and the extruding speed of the molding material can be easily decreased by broadening the width of the gap of the gap part 7. Therefore, for inhibiting occurrence of failure in formation of the outer wall, it is not necessary to prepare a plurality of shapes or sizes of the press plate 5 and select an optimum one from them or to change thickness of the gap part 57 or inner diameter of the back press plate 9 as in conventional techniques, and thus the productivity is conspicuously improved.

Furthermore, since the molding material can be extruded with adjusting the width of the gap of the gap part 7, not only occurrence of failure in formation of outer wall can be further diminished, but also an outer wall of the more uniform thickness can be formed. Therefore, orientation of the outer wall portion of the honeycomb structure is improved, and heat conductivity can be further lowered, and, for example, when the honeycomb structure is applied to a catalyst carrier for purification of exhaust gas of automobiles, distortion and cracks hardly occur.

As mentioned above, the gap adjusting means 130 is provided at a plurality of the positions with dividing the inner periphery of the press plate 5 at equal intervals, and hence can adjust the gap in a wide range, and occurrence of failure in formation can be inhibited in the whole area of the outer wall of the honeycomb structure.

Figure 15:
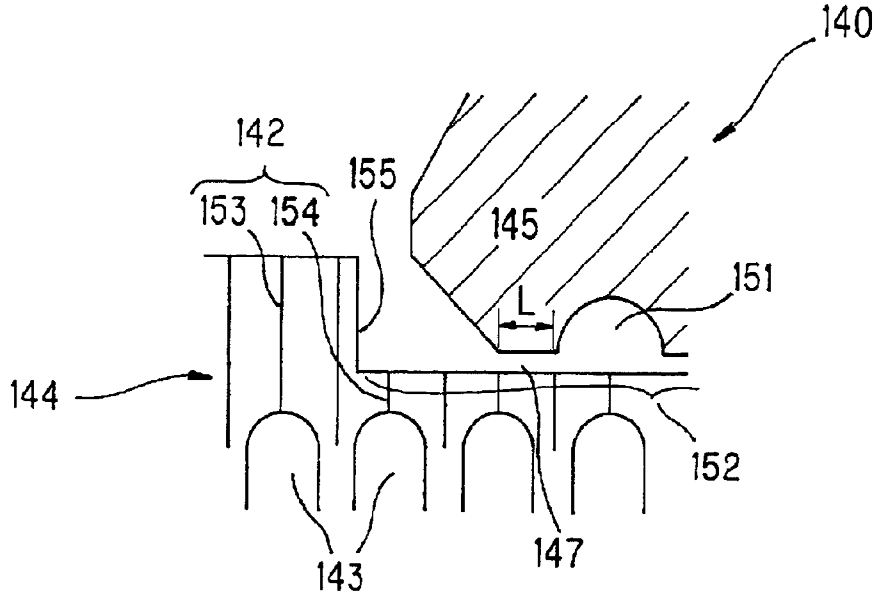
FIG. 15 is a partially enlarged sectional view showing one example of the second honeycomb structure molding apparatus of the present invention.
Figure 16:
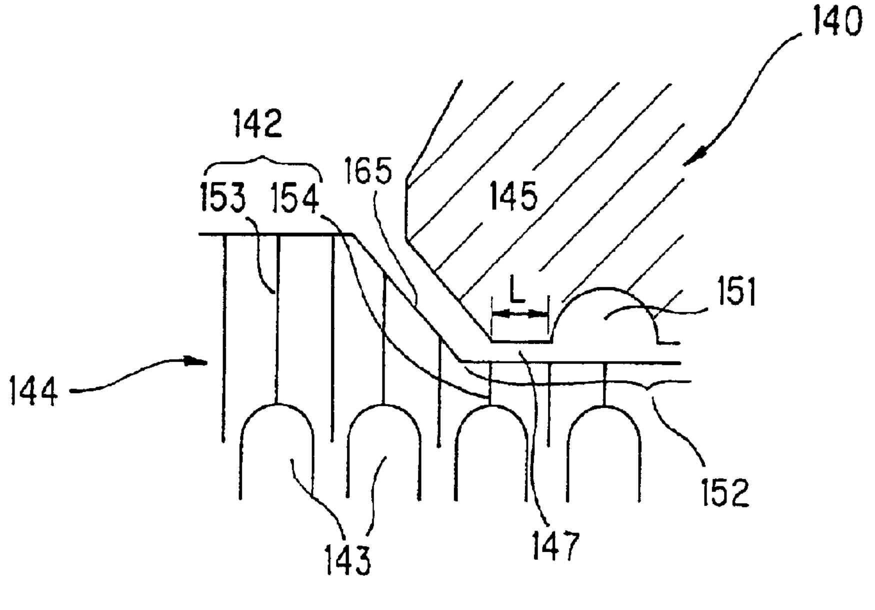
FIG. 16 is a partially enlarged sectional view showing another example of the second honeycomb structure molding apparatus of the present invention.
Figure 18:
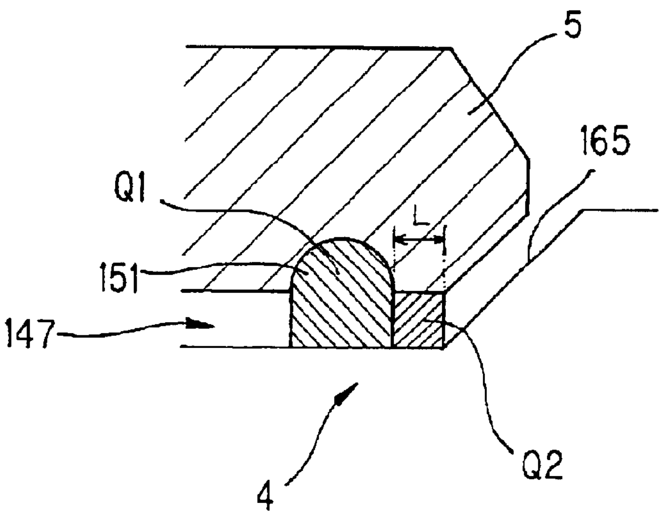
FIG. 18 is a partially enlarged sectional view showing another example of the second honeycomb structure molding apparatus of the present invention.

Next, the second honeycomb structure molding apparatus will be explained referring to FIG. 15, FIG. 16 and FIG. 18. FIG. 15, FIG. 16 and FIG. 18 are partially enlarged sectional views showing one example of the second honeycomb structure molding apparatus 140 of the present invention.

The second honeycomb structure molding apparatus 140 of the present invention is an apparatus for making a honeycomb structure using as a molding material, for example, a ceramics powder which is mixed with a molding aid. The general view of the second honeycomb structure molding apparatus 140 is not shown, but is the same as the first honeycomb structure molding apparatus, except that the gap adjusting means is not provided.

The second honeycomb structure molding apparatus 140 is characterized in that it has a reservoir part 151 comprising a ring dented part provided, at a press plate 145, outside by a given length L from the innermost end of a face opposing the downstream side of an outer peripheral part 152 of a spinneret 144 with facing a gap part 147. Volume of the dented part of the reservoir part 151 is preferably 1.8 times the volume of the gap part 147 which is inside from the reservoir part 151 and parallel to the spinneret.

The volume of dented part of the reservoir part 151 means in more detail not only the volume of the dented part, but also the volume of the gap part facing the dented part of the press plate 145, and is the portion indicated by Q1 in FIG. 18. Furthermore, the volume of the gap part 147 which is inside from the reservoir part 151 and parallel to the spinneret means the portion indicated by Q2 in FIG. 18.

In the second honeycomb structure molding apparatus 140 of the present invention, a molding material is also extruded from the upstream side of the spinneret 144 to the downstream side through the spinneret 144 by an extruder (not shown) as in the conventional techniques, and the molding material extruded from slits 153 provided at the inner side part of the spinneret 144 which is opened at the downstream side forms a honeycomb structure comprising many cells.

On the other hand, as in the conventional technique, the molding material extruded from slits 154 provided at the outer peripheral part 152 of the spinneret 144 progresses with changing its progressing direction from the extrusion direction to the direction of the level difference part 155 with the honeycomb shape being ruptured by the action of the gap part 147 and again changes its progressing direction to the extrusion direction at the opening of the press plate 145 thereby forming an outer wall which surrounds the cells.

In this case, most of the molding material extruded from slit 154 is adjusted in its amount to be extruded before reaching the level difference 155 by the buffer function of reservoir part 151. That is, even in the case of the slit 154 being provided at the same outer peripheral part 152, the molding material extruded from slit which is remoter from the level difference 155 changes in the speed of lowing the narrow gap part 147 with change of environment or change in fluidity caused by variation of raw materials and causes change in thickness of outer wall formed by the extruded molding material, but the change of speed of the molding material passing through the gap part 147 is absorbed by the reservoir part 151 provided in the vicinity of the innermost end of the press plate 145, and, thus, an outer wall of more uniform thickness can be formed.

Moreover, since when the molding material flows into the gap part 147 from the reservoir part 151, the material particles turn so as to easily move and flow in the same direction, variation of fluidity is relaxed and an outer wall of more uniform thickness can be formed.

As mentioned above, if the volume of the dented part of the reservoir part 151 is 1.8 times the volume of the gap part 147 which is inside from the reservoir part 151 and parallel to the spinneret, measures can be made against the change of fluidity of the molding material which may occur. Under such conditions, according to the second honeycomb structure molding apparatus 140 of the present invention, variation of thickness of the outer wall can be controlled to the range of about ±0.05 mm.

Next, a temperature controlling means which can be added to a third honeycomb structure molding apparatus having the characteristics of the first honeycomb structure molding apparatus or the second honeycomb structure molding apparatus, or both the first honeycomb structure molding apparatus and the second honeycomb structure molding apparatus, namely, having the gap adjusting means and the reservoir part will be explained referring to FIG. 4.

Figure 4:
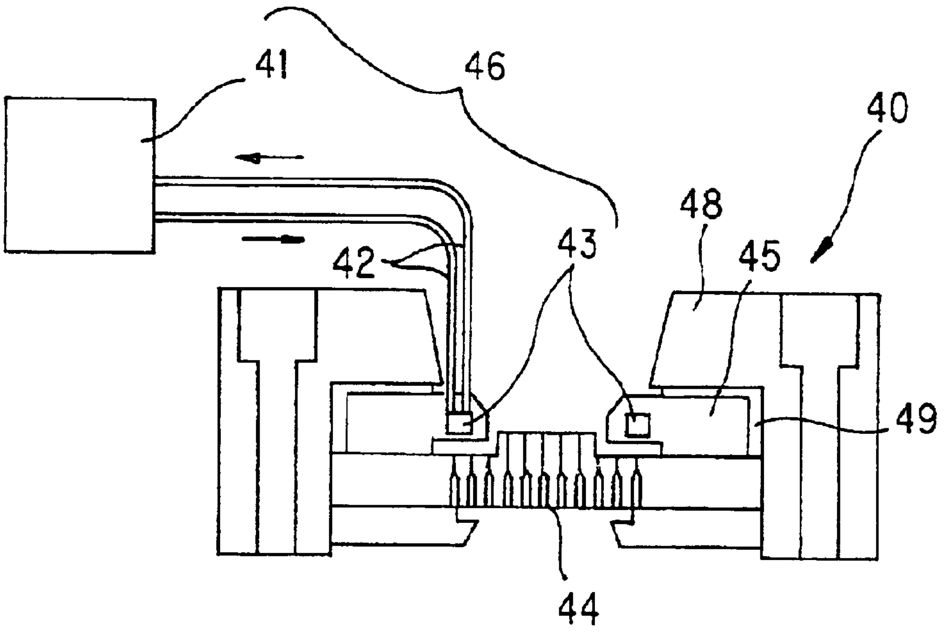
FIG. 4 is a sectional view showing one example of the honeycomb structure molding apparatus having a temperature control means according to the present invention.
Figure 5:
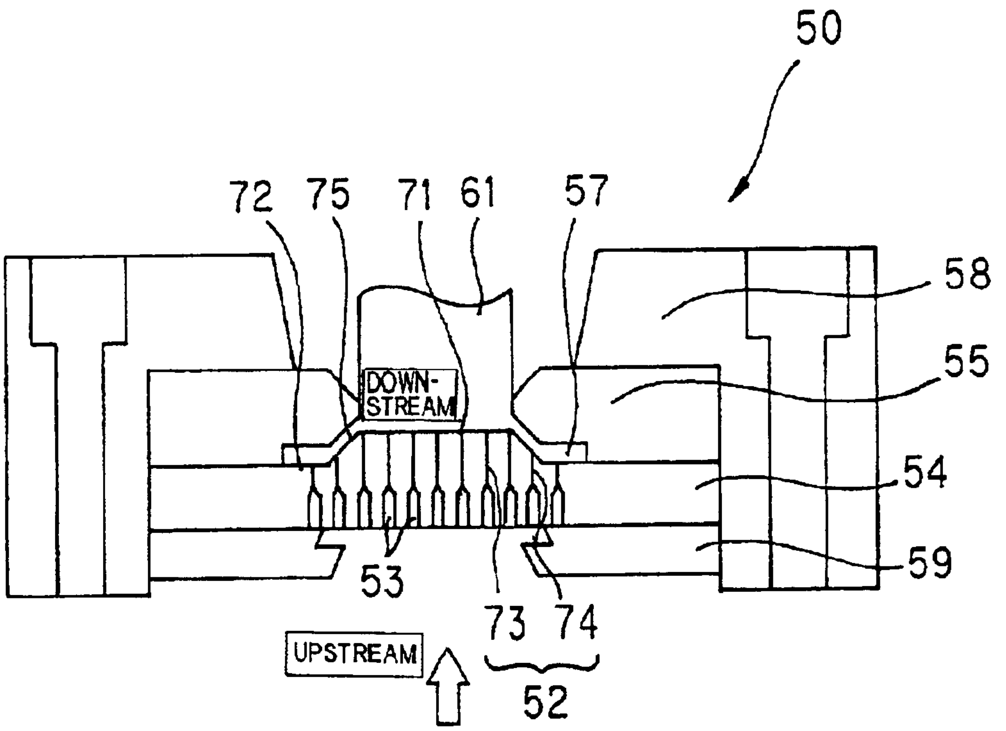
FIG. 5 is a sectional view showing one example of a conventional honeycomb structure molding apparatus.
Figure 6:
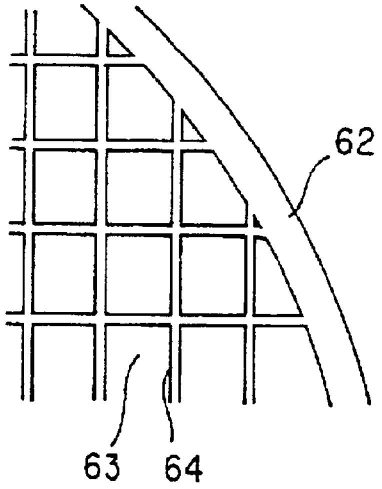
FIG. 6 is a partially enlarged view showing an example of honeycomb structures.
Figure 7:
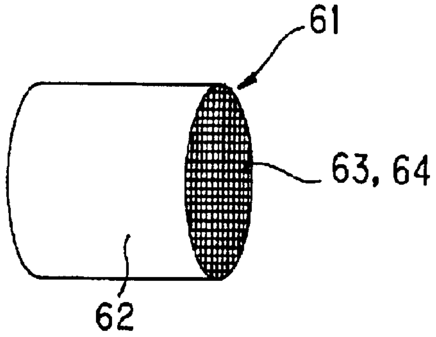
FIG. 7 is an oblique view showing an example of honeycomb structures.
Figure 8:
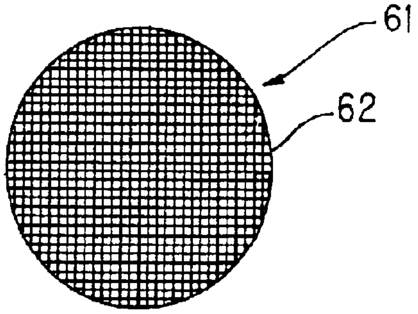
FIG. 8 is a front view showing an example of honeycomb structures.
Figure 9:
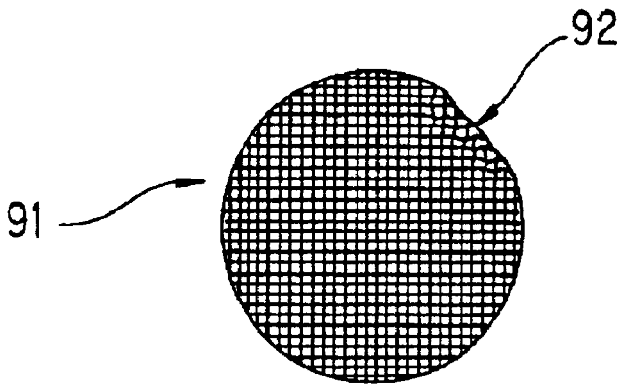
FIG. 9 is a front view showing an example of failure in formation of outer wall of a honeycomb structure.

FIG. 4 is a sectional view showing one example of the honeycomb structure molding apparatus having a temperature controlling means.

In the honeycomb structure molding apparatus 40, a temperature controlling means 46 comprises a hollow passage 43 provided in the press plate 45 and a water feeding device 41 which allows a circulating water of a desired temperature such cold water, warm water or the like to flow through the hollow passage 43 through a piping 42. By changing the temperature of the circulating water to control the temperature of the press plate 45, temperature of the molding material extruded from the spinneret 44 can be indirectly controlled. It is preferred to provide a heat insulator 49 between the press plate 45 and a press jig 48 so as to inhibit escape of heat to the press jig 48.

The range of temperature control of this temperature controlling means 46 is preferably about 5–35° C. Furthermore, the temperature controlling means 46 is more preferably such that a temperature control meter is provided at one or both of the press plate 45 and spinneret 44 and a heating and cooling device capable of heating and cooling the temperature of circulating water is provided at water feeding device to impart an automatic temperature controlling function which controls the temperature of the circulating water based on the temperature measured by the temperature control meter.

The temperature of the molding material passing through the gap part, namely, the molding material per se which forms an outer wall can be controlled by this temperature controlling means 46. Therefore, it becomes possible to control the molding speed of the outer wall without changing fluidity caused by change of environment at use or variation of starting material.

In detail, when molding speed of the outer wall becomes slower than that of the cells, and burr is considered to be formed, the molding material is heated to improve fluidity of the molding material for the formation of outer wall, and the molding speed is increased to allow to meet with the molding speed of the cell portion. As a result, occurrence of failure, namely, occurrence of burr can be inhibited.

On the other hand, if it is considered that wavy wall may be formed because the molding speed of the outer wall is higher than that of cells, fluidity of the molding material for the formation of the outer wall is reduced to lower the molding speed to meet with the molding speed of the cell portion. In this way, occurrence of failure due to the formation of wavy wall can be inhibited.

The honeycomb structure molding apparatus of the present invention can be constructed by suitable combination of the above-mentioned characteristics, namely, the gap adjusting means, the reservoir part and the temperature controlling means. Therefore, in conformity with the characteristics of the molding materials such as ceramics and metals, construction of apparatus can be selected which is low in cost and effective for inhibition of occurrence of failure in formation of outer wall.

The present invention will be explained by the following examples, which should not be construed as limiting the invention in any manner.

Failure in formation of outer wall in the molding step of each example was evaluated in the following manner.

(Method of Evaluation on Failure in Formation of Outer Wall)

Figure 10:
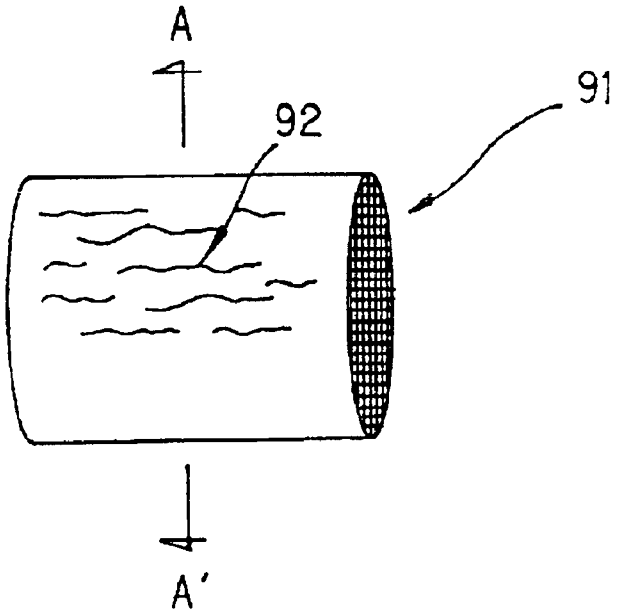
FIG. 10 is an oblique view showing an example of failure in formation of outer wall of a honeycomb structure.
Figure 11:
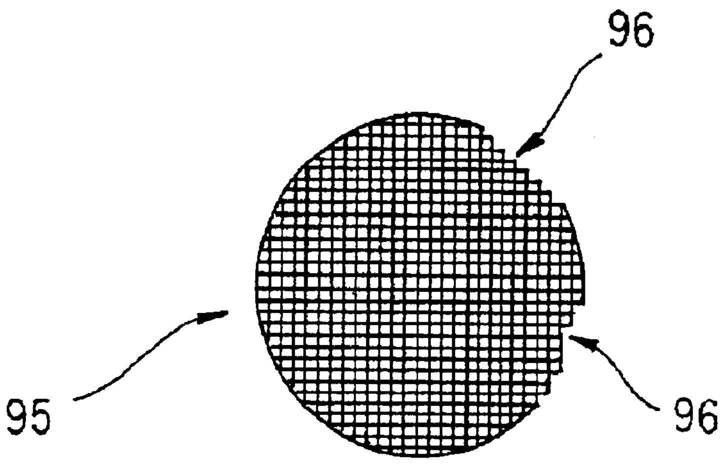
FIG. 11 is a front view showing another example of failure in formation of outer wall of a honeycomb structure.
Figure 12:
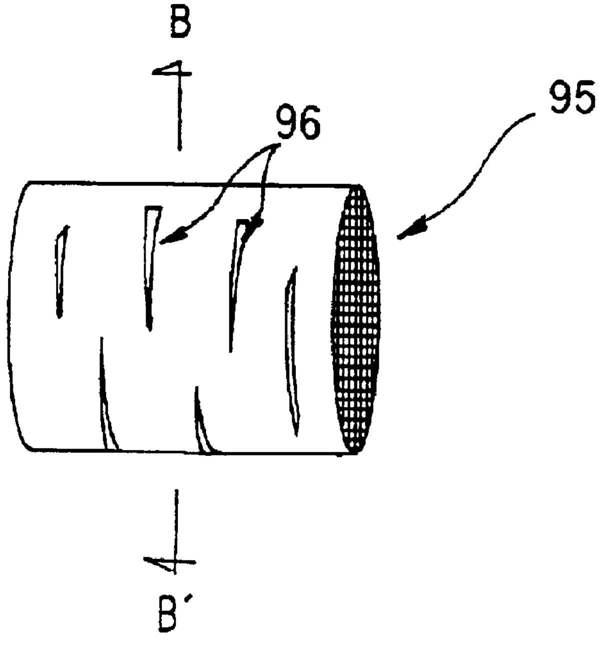
FIG. 12 is an oblique view showing another example of failure in formation of outer wall of a honeycomb structure.

A molded article was molded from an extrusion molding machine, and it was examined whether failure in formation of outer wall such as formation of waviness (as shown in FIG. 10) or burrs (as shown in FIG. 12) occurred or not. When the press plate provided with gap adjusting means or temperature controlling means as shown in the present invention is used, the occurrence of failure in formation of outer wall is inhibited by using the inhibition means. Extrusion length extruded during the time from inhibition of the failure in formation of outer layer being attained by the inhibition means until the next failure in formation of outer wall occurred was measured.

The molding materials for extrusion molding were prepared in the following manner to obtain two kinds of molding materials A and B.

(Method for Preparation of Ceramics Molding Materials)

In order to make a cordierite honeycomb structure, given amounts of talc, kaolin and aluminum hydroxide shown in Table 1 as starting materials were weighed, respectively, and they were mixed to obtain a starting material batch. Next, as a kneading step, to 100 mass % of the resulting starting batch were added 4 mass % of methyl cellulose and addition water, followed by carrying out kneading by a kneading apparatus (not shown) to obtain a kneaded product. At this kneading step, temperature of the kneading apparatus was controlled so that the temperature of the kneaded product reached 10° C. Then, the resulting kneaded product was deaerated by passing through a vacuum room and re-kneaded to prepare a columnar molding material A. This columnar molding material A was put in an extrusion molding machine and extruded to obtain a cordierite honeycomb structure.

TABLE 1

| Molding material | Av. particle diameter (μm) | Chemical analysis value (%) Ignition loss | | | | | | |
|---|---|---|---|---|---|---|---|---|
| | | | $SiO_2$ | $Al_2O_3$ | MgO | $TiO_2$ | $Fe_2O_3$ | CaO + $Na_2O$ + $K_2O$ |
| Talc | 6.7 | 5.2 | 61.7 | 0.4 | 30.7 | — | 1.3 | 0.2 |
| Kaolin | 21.3 | 13.5 | 45.5 | 38.5 | — | 1.3 | 0.5 | 0.1 |
| $Al(OH)_3$ | 0.6 | 34 | — | 65.6 | — | — | — | 0.3 |

(Method for Preparation of Metal Molding Material)

For making an Fe—Cr—Al metallic honeycomb structure, a given amount of an Fe—Cr—Al atomized powder was weighed to obtain a starting batch. Next, as a kneading step, to 100 mass % of the resulting starting batch were added 4 mass % of methyl cellulose and addition water, followed by carrying out kneading by a kneading apparatus (not shown) to obtain a kneaded product. At this kneading step, temperature of the kneading apparatus was controlled so that the temperature of the kneaded product reached 10° C. Then, the resulting kneaded product was deaerated by passing through a vacuum room and re-kneaded to prepare a columnar molding material B. This columnar molding material B was put in an extrusion molding machine and extruded to obtain an Fe—Cr—Al metallic honeycomb structure.

TABLE 2

| Molding material | Average Particle Diameter (μm) | Chemical analysis value (%) Fe | Cr | Al | Si | Ni | Ca |
|---|---|---|---|---|---|---|---|
| Atomized Fe—Cr—Al powder | 13.4 | 76.5 | 16.6 | 6.9 | — | — | — |

EXAMPLE 1

Figure 19:
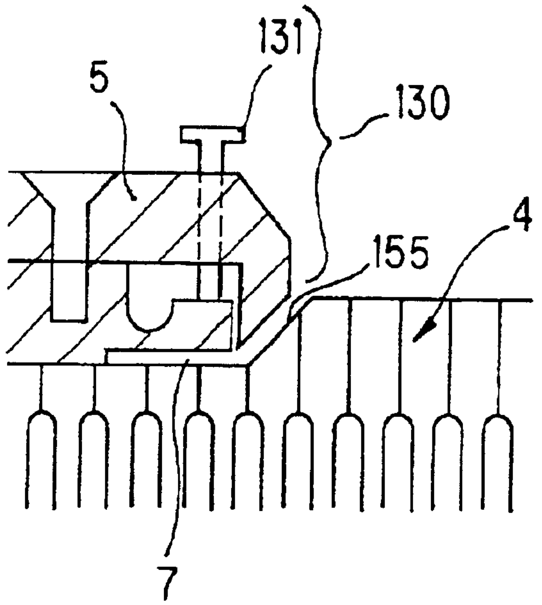
FIG. 19 is a partially enlarged sectional view of the honeycomb structure molding apparatus of the present invention which was used in Example 1.

Extrusion molding was carried out using the molding material A by a honeycomb structure molding apparatus provided with a gap adjusting means 130 and having a level difference part 155 comprising an inclined plane of about 45° as shown in FIG. 19 with setting a spinneret 4 and a press plate 5 so that the width of gap of the gap part 7 was 0.3 mm, and evaluation on failure in formation of outer wall was conducted.

EXAMPLE 2

Extrusion molding was carried out in the same manner as in Example 1, except that the molding material B was used, and evaluation on failure in formation of outer wall was conducted.

EXAMPLE 3

Extrusion molding was carried out in the same manner as in Example 1, except that width of the gap of the gap part 7 was 0.6 mm, and evaluation on failure in formation of outer wall was conducted.

EXAMPLE 4

Figure 20:
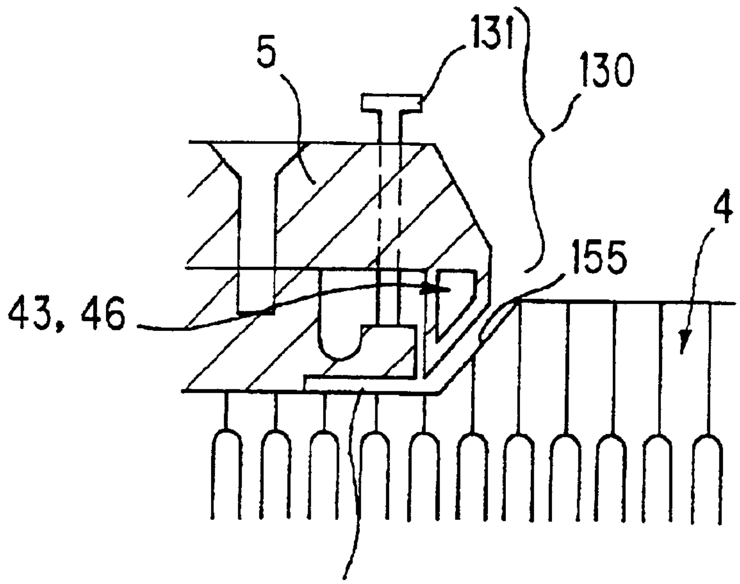
FIG. 20 is a partially enlarged sectional view of the honeycomb structure molding apparatus of the present invention which was used in Example 4.

A honeycomb structure molding apparatus provided with a gap adjusting means 130 and a temperature controlling means 46 and having a level difference part 155 comprising inclined plane of about 45° as shown in FIG. 20 was used. The temperature controlling means 46 allows a circulating water controlled in temperature to flow through hollow passage 43 provided in the press plate 5 from a water feeding device (not shown), thereby controlling the temperature of the press plate 5.

Extrusion molding was carried out using the molding material A with setting the spinneret 4 and the press plate 5 so that width of the gap of the gap part 7 was 0.3 mm, and with the range of temperature control of the press plate 5 being 10–30° C. Evaluation on failure in formation of outer wall was conducted.

EXAMPLE 5

Extrusion molding was carried out in the same manner as in Example 4, except that the molding material B was used, and evaluation on failure in formation of outer wall was conducted.

EXAMPLE 6

Figure 21:
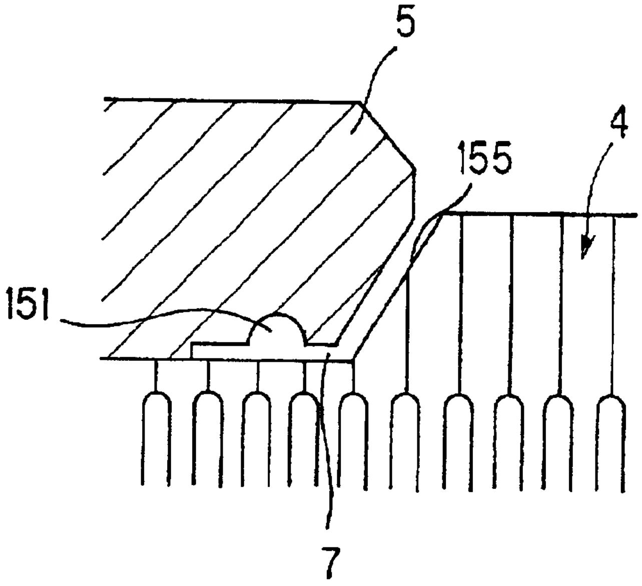
FIG. 21 is a partially enlarged sectional view of the honeycomb structure molding apparatus of the present invention which was used in Example 6.

Extrusion molding was carried out using the molding material A by a honeycomb structure molding apparatus provided with a reservoir part 151 and having the level difference part 155 comprising an inclined plane of about 45° as shown in FIG. 21 with setting a spinneret 4 and a press plate 5 so that the width of gap of the gap part 7 was 0.3 mm, and evaluation on failure in formation of outer wall was conducted.

The dented portion of the reservoir part 151 was formed in such size that volume Q1 of the dented portion and volume Q2 of the gap part satisfied Q1/Q2=2.0. The volume Q1 of the dented portion of the reservoir part 151 and the volume Q2 of the gap part were, in more detail, volumes of the portions shown in FIG. 18.

EXAMPLE 7

Figure 22:
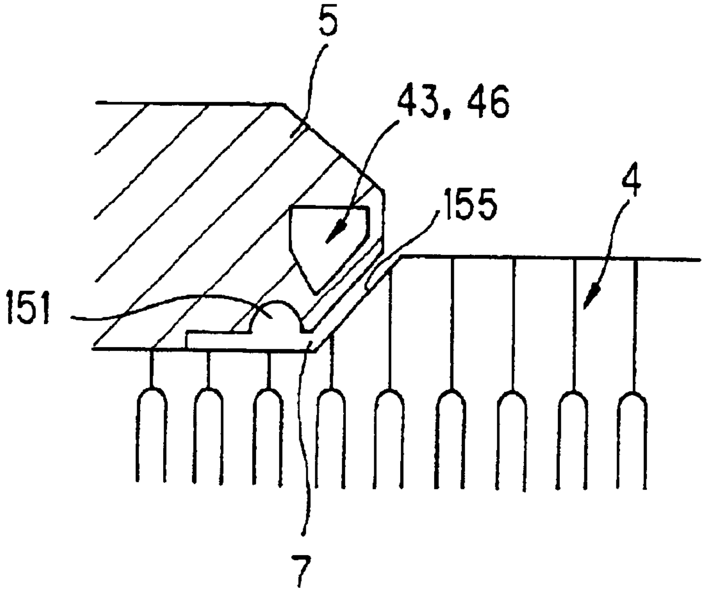
FIG. 22 is a partially enlarged sectional view of the honeycomb structure molding apparatus of the present invention which was used in Example 7.

Extrusion molding was carried out using the molding material A by a honeycomb structure molding apparatus provided with reservoir part 151 and temperature controlling means 46 and having the level difference part 155 comprising an inclined plane of about 45° as shown in FIG. 22 with setting a spinneret 4 and a press plate 5 so that the width of gap of the gap part 7 was 0.3 mm and with the range of temperature control of the press plate 5 being 10–30° C., and evaluation on failure in formation of outer wall was conducted.

The temperature controlling means 46 was the same as in Example 4, and the reservoir part 151 had the same size as in Example 6.

EXAMPLE 8

Figure 23:
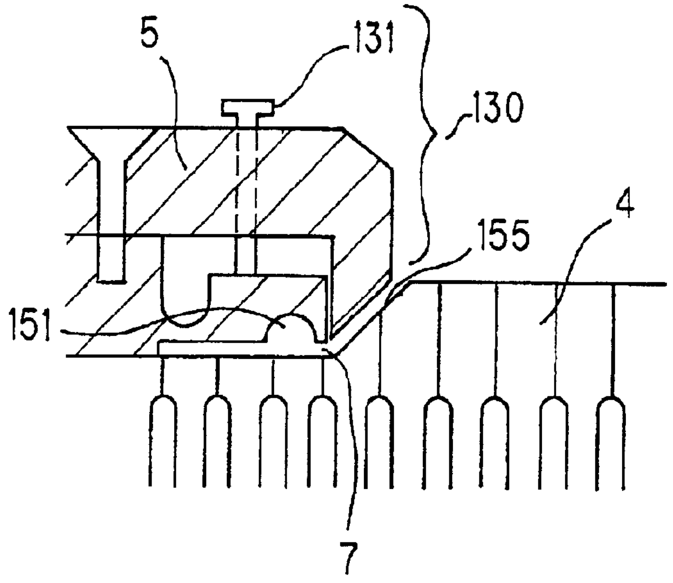
FIG. 23 is a partially enlarged sectional view of the honeycomb structure molding apparatus of the present invention which was used in Example 8.

Extrusion molding was carried out using the molding material A by a honeycomb structure molding apparatus provided with reservoir part 151 and gap adjusting means 130 and having the level difference part 155 comprising an inclined plane of about 45° as shown in FIG. 23 with setting a spinneret 4 and a press plate 5 so that the width of gap of the gap part 7 was 0.3 mm, and evaluation on failure in formation of outer wall was conducted.

The reservoir part 151 had the same size as in Example 6.

EXAMPLE 9

Figure 24:
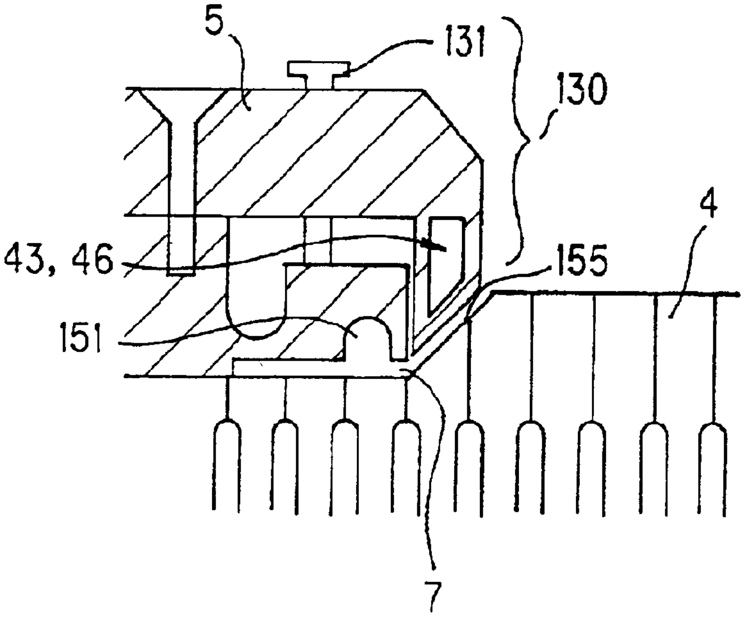
FIG. 24 is a partially enlarged sectional view of the honeycomb structure molding apparatus of the present invention which was used in Example 9.

Extrusion molding was carried out using the molding material A by a honeycomb structure molding apparatus provided with the reservoir part 151, the temperature controlling means 46 and the gap adjusting means 130, and having the level difference part 155 comprising an inclined plane of about 45° as shown in FIG. 24 with setting the spinneret 4 and the press plate 5 so that the width of gap of the gap part 7 was 0.3 mm and with the range of temperature control of the press plate 5 being 10–30° C., and evaluation on failure in formation of outer wall was conducted.

The temperature controlling means 46 was the same as in Example 4, and the reservoir part 151 had the same size as in Example 6.

EXAMPLE 10

Figure 25:
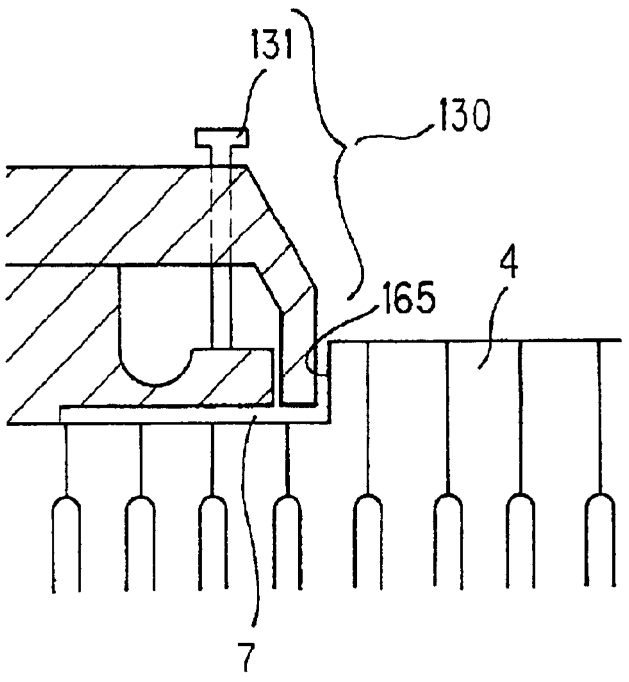
FIG. 25 is a partially enlarged sectional view of the honeycomb structure molding apparatus of the present invention which was used in Example 10.

Extrusion molding was carried out in the same manner as in Example 1, except for using a honeycomb structure molding apparatus having a level difference part 165 comprising a vertical plane of about 90° as shown in FIG. 25, and evaluation on failure in formation of outer wall was conducted.

EXAMPLE 11

Figure 26:
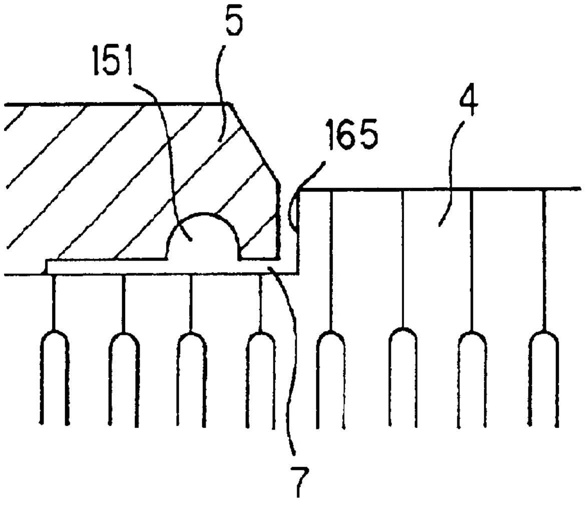
FIG. 26 is a partially enlarged sectional view of the honeycomb structure molding apparatus of the present invention which was used in Example 11.

Extrusion molding was carried out in the same manner as in Example 6, except for using a honeycomb structure molding apparatus having the level difference part 165 comprising a vertical plane of about 90° as shown in FIG. 26, and evaluation on failure in formation of outer wall was conducted.

EXAMPLE 12

Figure 30:
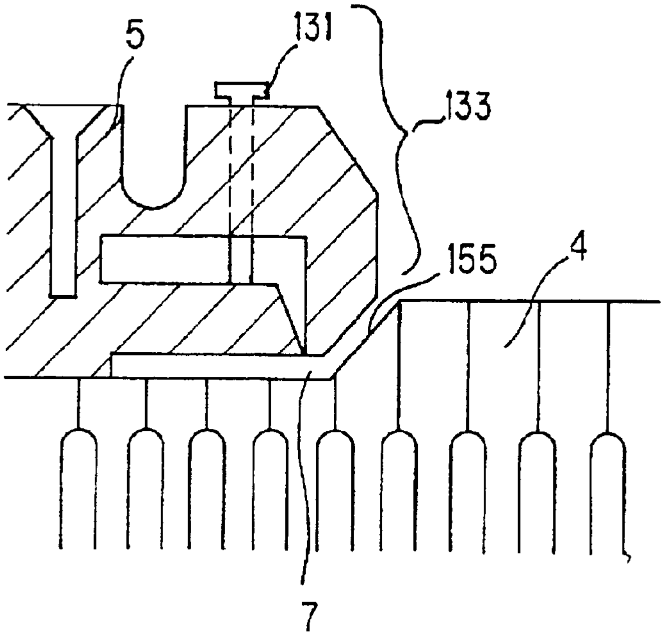
FIG. 30 is a partially enlarged sectional view of the honeycomb structure molding apparatus of the present invention which was used in Example 12.

Extrusion molding was carried out in the same manner as in Example 1, except for using a honeycomb structure molding apparatus provided with a gap adjusting means 133 as shown in FIG. 30, and evaluation on failure in formation of outer wall was conducted.

EXAMPLE 13

Figure 31:
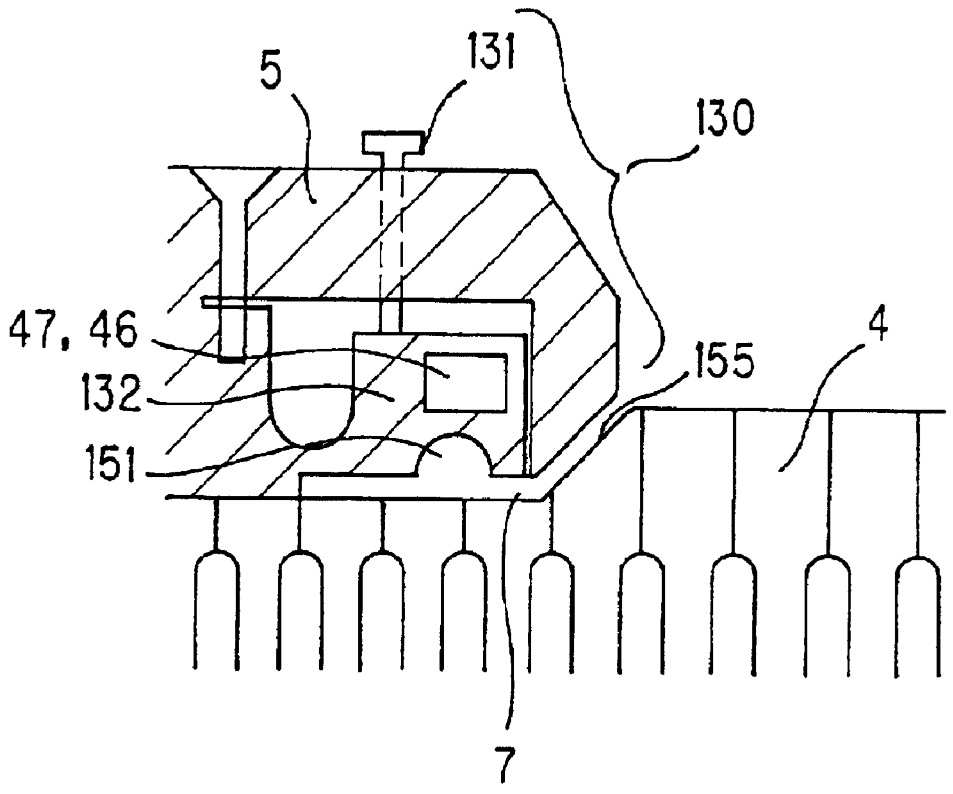
FIG. 31 is a partially enlarged sectional view of the honeycomb structure molding apparatus of the present invention which was used in Example 13.

Extrusion molding was carried out in the same manner as in Example 9, except for using a honeycomb structure molding apparatus which was not provided with the temperature controlling means 46 in the press plate 5 in such a manner as opposing the level difference part 155 of the spinneret as shown in FIG. 24, but was provided with the temperature controlling means 46 at a flexible part 132 of the press plate 5 as shown in FIG. 31, and evaluation on failure in formation of outer wall was conducted.

Comparative Example 1

Figure 27:
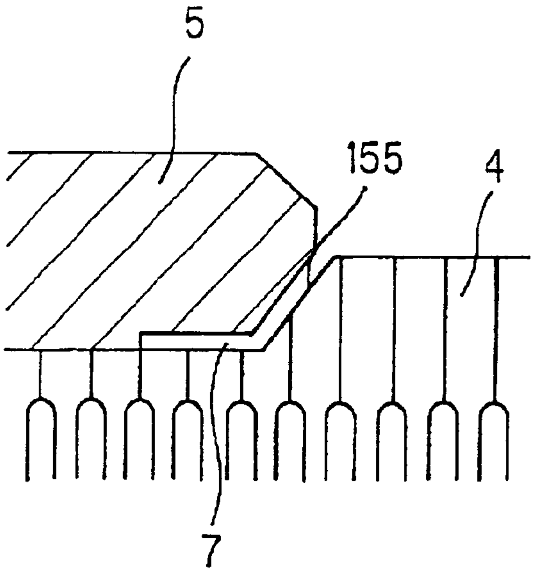
FIG. 27 is a partially enlarged sectional view of the conventional honeycomb structure molding apparatus which was used in Comparative Example 1.

Extrusion molding was carried out using the molding material A by a honeycomb structure molding apparatus having the level difference part 155 comprising an inclined plane of about 45 as shown in FIG. 27 with setting the spinneret 4 and the press plate 5 so that the width of gap of the gap part 7 was 0.3 mm, and evaluation on failure in formation of outer wall was conducted.

Comparative Example 2

Extrusion molding was carried out in the same manner as in Comparative Example 1, except that the molding material B was used, and evaluation on failure in formation of outer wall was conducted.

Comparative Example 3

Extrusion molding was carried out in the same manner as in Example 6, except that the dented portion of the reservoir part was formed in such a size as volume Q1 of the dented portion and volume Q2 of the gap part satisfying Q1/Q2=1.5, and evaluation on failure in formation of outer wall was conducted.

Comparative Example 4

Extrusion molding was conducted in the same manner as in Example 7, except that the range of temperature control of the press plate 5 was 36–40° C., and evaluation on failure in formation of outer wall was conducted.

Comparative Example 5

Extrusion molding was carried out in the same manner as in Example 7, except that the range of temperature control of the press plate 5 was 0–4° C., and evaluation on failure in formation of outer wall was conducted.

Comparative Example 6

Extrusion molding was carried out in the same manner as in Example 9, except that the range of temperature control of the press plate 5 was 36–40° C., and evaluation on failure in formation of outer wall was conducted.

Comparative Example 7

Figure 28:
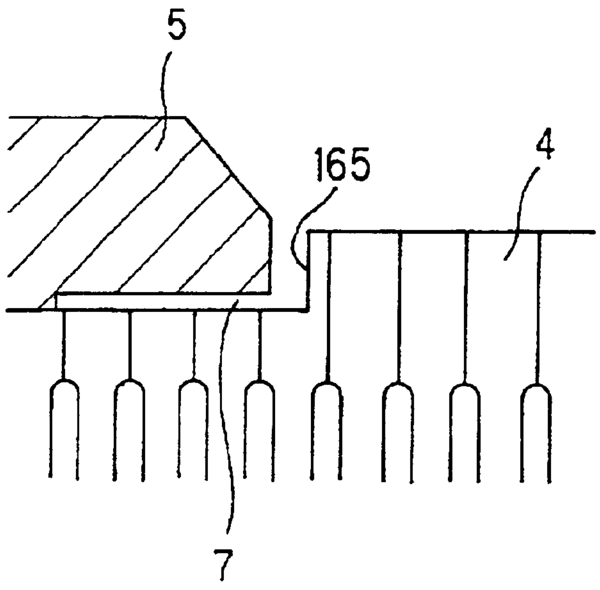
FIG. 28 is a partially enlarged sectional view of the conventional honeycomb structure molding apparatus which was used in Comparative Example 7.

Extrusion molding was carried out in the same manner as in Comparative Example 1, except for using a honeycomb structure molding apparatus having the level difference part 165 comprising a vertical plane of about 90° as shown in FIG. 28, and evaluation on failure in formation of outer wall was conducted.

Comparative Example 8

Figure 29:
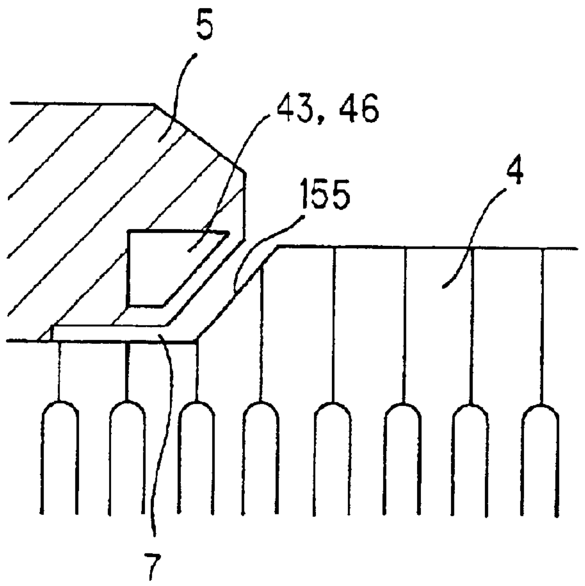
FIG. 29 is a partially enlarged sectional view of the conventional honeycomb structure molding apparatus which was used in Comparative Example 8.

Extrusion molding was carried out in the same manner as in Comparative Example 1, except for using a honeycomb structure molding apparatus provided with a temperature controlling means 46 as shown in FIG. 29, and evaluation on failure in formation of outer wall was conducted.

Evaluation

Results of evaluation in Examples 1–13 and Comparative Examples 1–8 are shown in Table 3. As can be seen from Table 3, within the specific ranges of the present invention, failure in formation of outer wall can be inhibited as compared with outside the ranges and the conventional ranges.

TABLE 3

| | Conditions | | | | | | Before taking measure against failure in formation of outer wall | | After taking measure against failure in formation of outer wall | | Length of molded product extruded from taking measure against failure until next failure occurred (Average of n = 5) |
|---|---|---|---|---|---|---|---|---|---|---|---|
| | Spec. for spinneret & press plate | Molding material | Width of gap in gap part | Volume of reservior (Relative ratio) | Control range of temp. of press plate | Angle of level difference part | Burr formation | Waviness | Burr formation | Waviness | |
| Exam. 1 | FIG. 19 | A | 0.3 mm | — | None | 45° | Present | Present | None | None | 9.9 m |
| Exam. 2 | FIG. 19 | B | 0.3 mm | — | None | 45° | Present | Present | None | None | 17.3 m |
| Exam. 3 | FIG. 19 | A | 0.6 mm | — | None | 45° | Present | Present | None | None | 3.6 m |
| Exam. 4 | FIG. 20 | A | 0.3 mm | — | 5 ~ 35° C. | 45° | Present | Present | None | None | 26.1 m |
| Exam. 5 | FIG. 20 | B | 0.3 mm | — | 5 ~ 35° C. | 45° | Present | Present | None | None | 37.0 m |
| Exam. 6 | FIG. 21 | A | 0.3 mm | 2.0 | None | 45° | None | None | — | — | Non-failure |
| Exam. 7 | FIG. 22 | A | 0.3 mm | 2.0 | 5 ~ 35° C. | 45° | None | None | None | None | Non-failure |
| Exam. 8 | FIG. 23 | A | 0.3 mm | 2.0 | None | 45° | None | None | None | None | Non-failure |

TABLE 3-continued

| | Conditions | | | | | | Before taking measure against failure in formation of outer wall | | After taking measure against failure in formation of outer wall | | Length of molded product extruded from taking measure against failure until next failure occurred (Average of n = 5) |
|---|---|---|---|---|---|---|---|---|---|---|---|
| | Spec. for spinneret & press plate | Molding material | Width of gap in gap part | Volume of reservior (Relative ratio) | Control range of temp. of press plate | Angle of level differ-ence part | Burr forma-tion | Wavi-ness | Burr forma-tion | Wavi-ness | |
| Exam. 9 | FIG. 24 | A | 0.3 mm | 2.0 | 5 ~ 35° C. | 45° | None | None | None | None | Non-failure |
| Exam. 10 | FIG. 25 | A | 0.3 mm | — | None | 90° | Present | Present | None | None | 10.8 m |
| Exam. 11 | FIG. 26 | A | 0.3 mm | — | None | 90° | None | None | — | — | Non-failure |
| Exam. 12 | FIG. 30 | A | 0.3 mm | — | None | 45° | Present | Present | None | None | 8.0 m |
| Exam. 13 | FIG. 31 | A | 0.3 mm | 2.0 | 5 ~ 35° C. | 45° | None | None | None | None | Non-failure |
| Com. Ex. 1 | FIG. 27 | A | 0.3 mm | — | None | 45° | Present | Present | — | — | — |
| Com. Ex. 2 | FIG. 27 | B | 0.3 mm | — | None | 45° | Present | Present | — | — | — |
| Com. Ex. 3 | FIG. 21 | A | 0.3 mm | 1.5 | None | 45° | None | Present | — | — | — |
| Com. Ex. 4 | FIG. 22 | A | 0.3 mm | 2.0 | 36 ~ 40° C. | 45° | Present | None | Present | None | — |
| Com. Ex. 5 | FIG. 22 | A | 0.3 mm | 2.0 | 0 ~ 4° C. | 45° | None | Present | None | Present | — |
| Com. Ex. 6 | FIG. 24 | A | 0.3 mm | 2.0 | 36 ~ 40° C. | 45° | Present | None | Present | None | — |
| Com. Ex. 7 | FIG. 28 | A | 0.3 mm | — | None | 90° | Present | Present | — | — | — |
| Com. Ex. 8 | FIG. 29 | A | 0.3 mm | — | 5 ~ 35° C. | 45° | Present | Present | Present | Present | — |

Remarks: Symbol "-" in Table 3 means that no data is available.

As explained above, according to the honeycomb structure molding apparatus and the molding method of the present invention, it becomes possible to easily perform fine adjustment or keeping constant of molding speed of the outer wall of the honeycomb structure, whereby failures in formation of outer wall, such as formation of burrs, wavy wall, distortion, etc. can be inhibited. Therefore, the present invention has the excellent effects that the honeycomb structure can be made in high yield, and the production cost can be further reduced.

What is claimed is:

1. A honeycomb structure molding apparatus for extrusion molding a honeycomb structure comprising a spinneret, and a press plate for fixing the spinneret, wherein the spinneret is provided with a back pore part for introducing a molding material and a slit part for extruding the molding material and comprises an inner side part and an outer peripheral part, the inner side part is protruded to the downstream side to form a level difference part between the inner side part and the outer peripheral part, wherein the press plate is opened opposing the inner side part of the spinneret and presses the downstream side of the outer peripheral part of the spinneret through a gap part formed between the spinneret and the press plate; said press plate having a flexible portion as adjustable means located inside the press plate facing said outer peripheral part of the spinneret and said flexible portion being capable of movement toward the outer peripheral part of the spinneret to close the width of the gap of the gap part upon movement of the flexible portion.

2. A honeycomb structure molding apparatus according to claim 1, wherein the gap adjusting means comprises a flexible part provided at the press plate and an adjusting instrument flexing the flexible part, said adjusting means flexing the flexible part to fix it at a desired position and adjust the width of the gap.

3. A honeycomb structure molding apparatus according to claim 2, wherein the adjusting instrument is a screw that pierces through the press plate and whose head is exposed on the upper surface of the press plate.

4. A honeycomb structure molding apparatus according to claim 2, wherein the gap adjusting means is provided at an inner peripheral end part of the press plate and opposing the innermost part of the outer peripheral part of the spinneret, and a plurality of the gap adjusting means are provided dividing the inner periphery at equal intervals.

5. A honeycomb structure molding apparatus according to claim 4, wherein the range of adjustment of the width of the gap by the gap adjusting means is about 0–0.50 mm.

6. A honeycomb structure molding apparatus according to claim 2, wherein the flexible part provided at the press plate adjusts the width of the gap of the gap part formed between the level difference part of the spinneret and the press plate.

7. A honeycomb structure molding apparatus according to claim 1, wherein the level difference part has a tapered spinneret having an inclined plane of about 30–60°.

8. A honeycomb structure molding apparatus according to claim 1, wherein the level difference part has a right-angled spinneret having an inclined plane of about 90°.

9. A honeycomb structure molding apparatus according to claim 1, wherein the honeycomb structure is supported on a surface of a cell partition wall and/or an inner surface of pores inside the partition wall.

10. A honeycomb structure molding apparatus according to claim 1, having more than one spinneret slit for extruding a molding material to the gap part.

11. A honeycomb structure molding apparatus for extrusion molding a honeycomb structure, characterized in that it has at least a spinneret provided with a back pore part for introducing a molding material and a slit part for extruding the molding material, and a press plate for fixing the spinneret, the spinneret comprises an inner side part and an outer peripheral part the inner side part is protruded to the downstream side to form a level difference part between the inner side part and the outer peripheral part, the press plate is opened opposing the inner side part of the spinneret and presses the downstream side of the outer peripheral part of the spinneret through a gap part formed between the spinneret and the press plate, and a reservoir part comprising a ring dented part is provided in the press plate at the position outside by a given length L facing the gap part from the innermost end of the face opposing the downstream side of the outer periphery part at the spinneret, both ends of the reservoir part being at the same level to each other, the press plate having a slant face to the plane of the gap part and starting from one end of the reservoir part, the slant face facing the level difference.

12. A honeycomb structure molding apparatus according to claim 11, wherein the volume of the dented portion of the reservoir part is 1.8 times the volume of the gap part that is inside the reservoir part and parallel to the spinneret.

13. A honeycomb structure molding apparatus according to claim 11, wherein the level difference part has a tapered spinneret having an inclined plane of about 30–60°.

14. A honeycomb structure molding apparatus according to claim 11, further comprising a gap adjusting means capable of changing width of the gap of the gap part.

15. A honeycomb structure molding apparatus according to claim 14, wherein the level difference part has a tapered spinneret having an inclined plane of about 30–60°.

16. A honeycomb structure molding apparatus according to claim 11, further comprising a temperature controlling means capable of changing the temperature of the molding material.

17. A honeycomb structure molding apparatus according to claim 16, wherein the temperature controlling means comprises a hollow passage provided in the press plate and a water feeding device that allows a circulating water of a desired temperature to flow through the hollow passage, and the temperature of the press plate is changed to control the temperature of the molding material.

18. A honeycomb structure molding apparatus according to claim 16, wherein the range of temperature control by the temperature controlling means is 5–35°C.

19. A honeycomb structure molding apparatus according to claim 16, wherein the temperature controlling means has a temperature control meter provided at the press plate and/or the spinneret.

* * * * *